United States Patent [19]

Drechsler et al.

[11] Patent Number: 4,487,379

[45] Date of Patent: Dec. 11, 1984

[54] COILABLE TAPE RULE WITH SHIFTING HUB, REEL ASSEMBLY THEREFOR, AND METHOD OF ASSEMBLING

[75] Inventors: Mark A. Drechsler, Southington; Edward C. Rutty, Portland, both of Conn.

[73] Assignee: The Stanley Works, New Britain, Conn.

[21] Appl. No.: 447,703

[22] Filed: Dec. 7, 1982

[51] Int. Cl.³ .............................................. B65H 75/48
[52] U.S. Cl. ....................................... 242/107; 33/138
[58] Field of Search ............... 242/107, 107.5; 185/45; 33/138; 254/364

[56] References Cited

U.S. PATENT DOCUMENTS

| | | | |
|---|---|---|---|
| 2,172,043 | 9/1939 | Wolf | 33/138 X |
| 2,602,958 | 7/1952 | Brown | |
| 3,062,479 | 11/1962 | Griffitts | |
| 3,384,321 | 5/1968 | Becker et al. | |
| 3,447,229 | 6/1969 | Clark | |
| 3,694,588 | 9/1972 | Appleton | |
| 3,716,201 | 2/1973 | West | 242/107 |
| 4,045,079 | 8/1977 | Arlauskas et al. | |
| 4,142,693 | 3/1979 | Czerwinski | 33/138 X |
| 4,159,809 | 7/1979 | Rawson | |

FOREIGN PATENT DOCUMENTS 2076635 12/1981 United Kingdom ................ 242/107

*Primary Examiner*—John M. Jillions
*Assistant Examiner*—Katherine Jaekel

[57] ABSTRACT

A power returnable coilable rule employs a casing which has on the inside surface of one of its end walls a non-circular recess, and a reel which has on its adjacent end wall a recess of similar configuration. Slidably seated in the central passage through the reel is a hub with a barrel portion extending into the passage of the reel and a flange at one end having a cross section dimensioned and configured cooperatively to seat snugly in either of the recesses. In assembling the prewound reel in the casing, the flange is initially seated in the recess of the reel to prevent relative rotation therebetween and thereafter the hub is shifted axially to seat the flange in the recess of the casing so as to permit the reel to rotate thereabout.

17 Claims, 5 Drawing Figures

COILABLE TAPE RULE WITH SHIFTING HUB, REEL ASSEMBLY THEREFOR, AND METHOD OF ASSEMBLING

BACKGROUND OF THE INVENTION

The present invention relates to power returnable coilable rules of the type which employ a reel or spool within which are wound the power return or recoil spring and the measuring blade, and which are intended to be inserted into a casing to provide the complete assembly.

As will be readily appreciated, power returnable coilable rules are widely employed because of the convenience which they afford to the user in rewinding the tape within the casing. Most recoilable rules now employ a reel or cartridge containing the power return spring and the measuring blade, and frequently such rules enable the purchaser to replace the reels or at least the measuring blade in the event that it is damaged or broken. In such cartridges, there is generally provided a hub or post which is fixed within the casing and in which one end of the spring is engaged. The reel portion of the assembly is then free to rotate thereabout to permit the blade to coil and uncoil as it is withdrawn from the casing or rewound into the casing.

Various structural arrangements have been proposed and utilized for securing the hub or post member in the cartridge or in the final rule assembly. When the spring is prewound and tensioned in the reel prior to insertion in the case, the member to which its inner end is fixed must be non-rotatable relative to the reel but the reel must, after assembly in the casing, be rotatable relative to the casing. Accordingly, some arrangements have involved temporary hubs which are withdrawn; others have used interfitting elements to effect the change in the member (reel or casing) as to which the spring is non-rotatable.

It is an object of the present invention to provide a novel power returnable coilable rule wherein a shiftable hub member is initially non-rotatably engaged with the reel member and thereafter movable axially into engagement with the casing of the rule upon assembly to permit the reel to rotate about the hub and relative to the casing.

It is also an object to provide such a rule in which the several elements may be readily and relatively economically fabricated and thereafter readily assembled into a long lived structure.

Another object is to provide a cartridge for a coilable rule which may be prewound and readily assembled in the casing.

A further object is to provide a simple and relatively trouble-free method for assembling a prewound cartridge into the casing to form a power returnable coilable rule.

SUMMARY OF THE INVENTION

It has now been found that the foregoing and related objects can be readily attained in a coilable rule which has a casing comprised of a pair of mating sections defining a chamber therewithin, with one of the sections having a hub seating recess on its inner surface. Rotatably disposed within the casing is a reel having a cylindrical core, annular end walls of greater diameter than the core portion to provide an annular chamber thereabout, and an axially extending passage therethrough. A hub seating recess is provided in the outer surface of the end wall adjacent the hub seating recess of the casing section.

An axially shiftable hub has a barrel in the passage of the reel and a flange at the end thereof adjacent the first mentioned casing section. The flange and the hub seating recesses are cooperatively dimensioned and configured so that the flange will releasably lock in the recesses and thereby lock the hub against relative rotation. Initially, the hub flange is frictionally engaged in the hub seating recess of the reel and is shiftable axially into the hub seating recess of the casing to permit the reel to rotate about the barrel. Coiled within the core portion of the reel is a recoil spring which has its inner end engaged with the barrel and its outer end extending outwardly of the core portion of the reel for engagement with the measuring blade.

Preferably, the hub seating recesses and the hub flange are of generally polygonal cross section, and the flange and recesses have opposed, outwardly extending finger portions to enhance the engagement.

Desirably, the other of the casing sections has a recess of non-circular cross section in its inner surface, and the post has an end portion of cooperating cross section seated in this recess. Moreover, the first casing section will usually have a post thereon generally centrally of the hub seating recess, and the barrel of the hub has a bore therein in which the casing post extends to guide the hub on the first casing section.

Most usually, the hub seating recess of the one casing section is of greater depth than the thickness of the hub flange, and the hub seating recess of the reel is of lesser depth than the thickness of the hub flange. Moreover, the reel end walls have cylindrical bosses on the outer surfaces thereof, and the hub seating recess is in one of these bosses.

The spring cartridge to provide a rule assembly has the flange of the hub frictionally engaged in the hub seating recess of the reel to prevent relative rotation until the cartridge is mounted in the casing.

In assembling the coilable rule, the spring cartridge is placed in a casing section having the cooperatively configured hub seating recess in its inner surface. The hub is axially shifted to unseat the hub flange from the seating recess of the reel and seat it in the hub seating recess of the casing section to permit the reel to rotate about the hub and relative to the casing section. Thereafter, a mating casing section is placed over the reel, and the two casing sections are secured in assembly.

As a part of such assembly, one end of a coilable rule measuring blade is engaged with the outer end of the recoil spring and coiled about the core portion of the reel.

BRIEF DESCRIPTION OF THE ILLUSTRATED EMBODIMENT

DETAILED DESCRIPTION OF THE ILLUSTRATED EMBODIMENT

Figure 1:
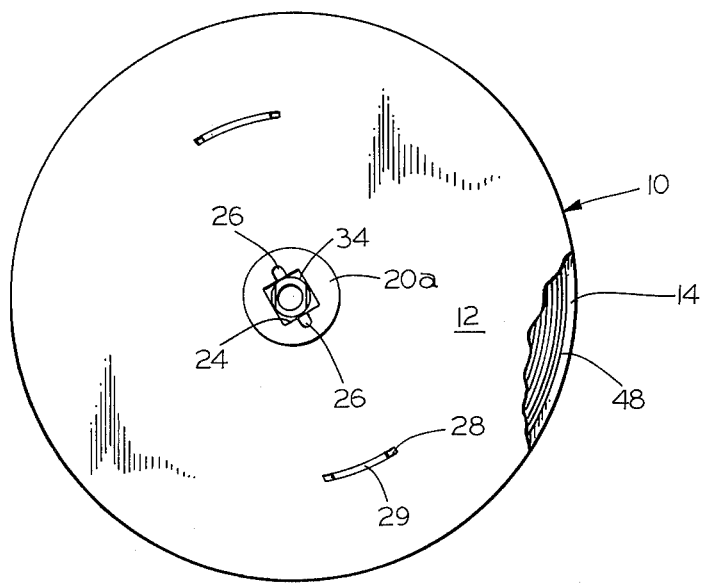
FIG. 1 is a plan view of a reel or cartridge for a coilable rule embodying the present invention with one end wall of the reel broken away to reveal internal construction.
Figure 2:
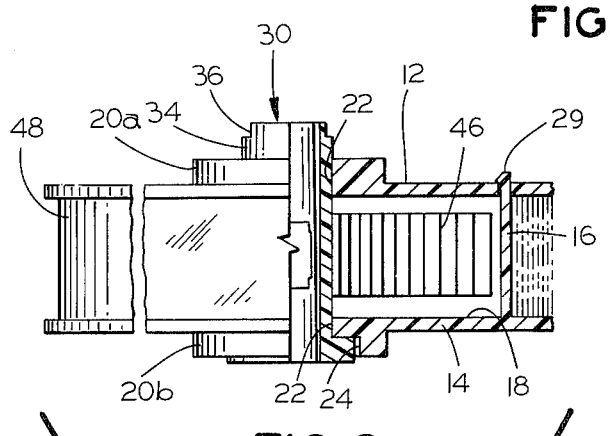
FIG. 2 is a side elevational view of the cartridge of FIG. 1 with portions broken away to reveal internal construction.
Figure 3:
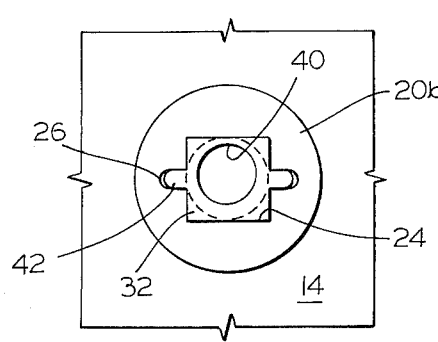
FIG. 3 is a fragmentary bottom view of the cartridge.

Turning first to FIGS. 1-3, therein illustrated is a power returnable coilable rule reel or cartridge embodying the present invention wherein the reel housing or casing is generally designated by the numeral 10 and consists of mating halves with generally annular end walls 12, 14 and a cylindrical core wall 16 defining a chamber 18 therewithin between the end walls 12, 14. On the outer surfaces of the end walls 12, 14 are axially extending, generally cylindrical bosses 20a, 20b with aligned apertures 22 extending therethrough to provide the central passage.

As best seen in FIGS. 2 and 3, the outer surfaces of the bosses 20a, 20b each have a recess 24 therein about the aperture 22 which is of generally square configuration with a pair of aligned finger portions 26 projecting from opposite sides thereof. Each of the mating sections of the reel housing 10 has apertures 28 in its end walls 12, 14 which frictionally seat cooperating projections 29 on the section of the core wall 16 provided by the other mating section.

Figure 5:
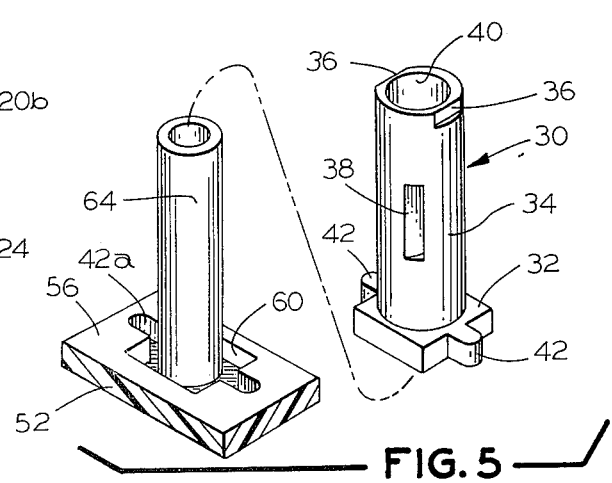
FIG. 5 is an exploded view of a fragmentary portion of the casing end wall and of the hub.

Extending through the reel housing passage defined by the apertures 22 is a shiftable hub generally designated by the numeral 30 and which is best seen in FIG. 5. The hub 30 has a base or flange 32 and a cylindrical barrel 34 with diametrically opposed, secantally extending flats 36 at its free end and an axially extending, secantally disposed slot 38 intermediate its length. The flange 32 is of generally square configuration with a pair of fingers 42 projecting from opposed sides thereof, and a bore 40 extending through the barrel 34 and flange 32 is offset to one side of the centerline of the barrel 34 as will be more fully explained hereinafter.

The flange 32 is configured to fit snugly into the recess 24 of the reel 10 and frictionally engage therewithin, and its thickness is slightly greater then the depth of the recess 24 so that it extends outwardly of the plane defined by the outer surface of the boss 20b in which it is seated. The axial length of the barrel 34 is greater than the thickness of the reel housing 10 so that its free end extends outwardly of the plane of the boss 20a on the other end wall 12.

As also seen in FIG. 2, a power spring 46 in the chamber 18 is helically wound about the hub 30 with its inner end engaged in the slot 38 of the barrel 34. The outer end of the spring 46 extends through a passage (not shown) in the core wall 16 and is engaged with the metal measuring blade 48 which is coiled in the annular chamber defined by the end walls 12, 14 and outer surface of the core 16.

Figure 4:
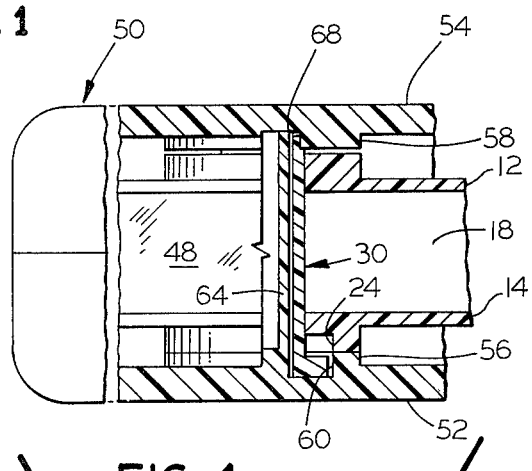
FIG. 4 is a fragmentary side elevational view to an enlarged scale of a coilable rule assembly utilizing the cartridge of FIGS. 1–3 and with portions broken away to reveal internal construction.

In FIG. 4, the coilable rule is shown as assembled with the rule housing or casing generally designated by the numeral 50 and formed from two sections providing end walls 52, 54 and a peripheral sidewall having a blade passage therein (not shown) through which the measuring blade 48 exits.

The end wall 52 has molded in its inner surface a boss 56 having a recess 60 which is generally square with opposed, oppositely extending finger portions 42a cooperatively configured and dimensioned to snugly seat the flange 32 and finger portions 42 of the hub 30, and its depth is greater than the thickness of the hub flange 32. Offset to one side of the centerline of the recess 60 is an upstanding cylindrical post 64 of annular cross section which extends upwardly into the bore 40 of the hub 30.

The end wall 54 has molded therein a boss 58 with a recess 68 having arcuate ends and rectilinear sides cooperatively dimensioned and configured to seat the free end of the barrel 34 of the hub 30. Since both ends of the hub 30 are snugly seated in the recesses 60, 68 which will not permit it to rotate therein, it is prevented from rotation when assembled in the casing 50, although the reel 10 is free to rotate thereabout once the flange 32 is disengaged from recess 24 in the reel 10.

In assembling the rule of the present invention, the inner end of the power return spring 46 is inserted into the slot 38 of the hub 30 and the lower section of the reel and the spring 46 is coiled within the chamber 18 with its outer end projecting outwardly of the core wall 16. During this initial assembly operation, the hub 30 is non-rotatable with respect to the lower section of the reel 10 by reason of the frictional engagement of the flange 32 within the recess 24 in the reel end wall 14. The reel is then rotated in a fixture to coil the spring 46 to a predetermined tensioning with the outer end projecting beyond the circumference of the reel 10. The upper section of the reel 10 is then snapped onto the lower section at the same time locking the outer end of the power spring to the reel 10, and the two sections are preferably ultrasonically welded to increase the security of assembly.

It will be appreciated, however, that the hub 30 may be rotatably mounted in a fixture with the reel 10 being non-rotatable therein to permit rotation of the hub in the fixture to coil the spring 46 within the reel 10.

After the spring cartridge has been prewound, it is placed in the lower casing section with the post 64 on the casing end wall 52 aligned with the bore 40 in the hub 30 and with the finger portions 42 on the projecting portion of the hub flange 32 aligned with the finger portions 42a of the recess 60 in the casing end wall 52. The outer end of the spring 46 is led through the blade passage in the casing 50 and the blade lock (not shown) is used to secure it in this extended position. The upper end of the barrel 34 is then pushed downwardly to move the flange 32 from the recess 24 in the reel 10 and press it downwardly into the recess 60 of the casing end wall 52.

At this point, the reel 10 is now rotatable with respect to the hub 30 and the casing 50. The coilable blade 48 is now engaged with the projecting end of the spring 46, and the lock is released to permit the spring 46 to coil the blade 48 within the casing 50 about the reel core wall 16. The upper section of the casing 50 is then placed over the lower section with the flats of the recess 68 in the end wall 54 aligned with the flats 36 of the barrel 34. The barrel 34 is then seated in the recess 68, the two sections pressed together and fasteners inserted to secure the two sections in assembly.

If so desired, the coilable blade 48 may be wound about the reel 10 before insertion into a casing so as to provide a complete replacement cartridge. In this form, suitable clamping means must be provided to secure the coiled elements against uncoiling.

It will be appreciated that the dimensioning and configuration of the recesses 24, 60 and of the flange 32 of the hub 30 should be cooperative so as to frictionally engage the flange 32 within the respective recess 24, 60. The finger portions of the recesses 24, 60 increase the surface area for frictional engagement as well as provide the means to ensure proper alignment of the hub 30 and reel 10 relative to the casing 50.

The specific configuration of the flange 32 and of the recesses 24, 60 may be selected from any non-circular form which will provide a non-circular assembly preventing relative rotation of the hub 30 relative to the part in which it is seated. The generally square configuration of the illustrated embodiments has been found highly effective and beneficial from the standpoint of effecting the alignment of the parts.

The bore 40 in the barrel 34 of the hub 30 is offset from the center thereof to accommodate the secantal orientation of the spring receiving slot 38, and the offsetting of the post 64 on the end wall 52 of the casing 50 is to effect alignment therewith. This offsetting relative to the recess 60 also facilitates proper orientation of the cartridge reel 10 relative to the casing 50.

Desirably, the rule includes a blade locking mechanism of which many forms are presently known including that of West U.S. Pat. No. 3,214,836 granted Nov. 2, 1965. It may also include speed control cams of the type disclosed in Van Zelderen U.S. Pat. No. 3,889,897.

The reel, hub, and casing are conveniently formed by injection molding from synthetic resins such as acrylonitrile-butadiene-styrene interpolymer, nylon, acetal, polypropylene, glass-filled polyesters, etc. Engineering grade resins such as nylon and acetal are preferably employed for the hub. If so desired, the casing may be die cast from metal such as aluminum.

Thus, it can be seen that the coilable rules of the present invention have a novel hub and reel assembly wherein the hub is initially non-rotatable with respect to the reel to permit coiling of the spring within the reel and and is thereafter shiftable to engage it with the rule casing to permit the reel to rotate thereabout. The several elements of the assembly may be readily fabricated and assembled, and the assembly provides long-lived and relatively trouble free operation.

Having thus described the invention, we claim:

1. In a coilable rule, the combination comprising:
   A. a casing comprising a pair of mating sections defining a chamber therewithin, one of said sections having a hub seating recess on its inner surface;
   B. a reel rotatable within said casing having a cylindrical core, annular end walls of greater diameter than said core portion to provide an annular chamber thereabout, and an axially extending passage therethrough, said reel having a hub seating recess in the outer surface of the end wall adjacent said hub seating recess of said one casing section;
   C. an axially shiftable hub having a barrel in said passage of said reel and a flange at the end thereof adjacent said one casing section, said flange and said hub seating recesses being cooperatively dimensioned and configured to lock said flange and thereby said hub against relative rotation, said hub flange being frictionally engageable in said hub seating recess of said reel and shiftable axially into said hub seating recess of said casing to permit said reel to rotate about said barrel; and
   D. a recoil spring coiled within said core portion of said reel and having its inner end engaged with said barrel and its outer end extending outwardly of said core portion of said reel.

2. The coilable rule of claim 1 wherein said hub seating recesses and said hub flange are of generally polygonal cross section.

3. The coilable rule of claim 2 wherein said flange has opposed, outwardly extending finger portions and said recesses have cooperating finger portions.

4. The coilable rule of claim 1 wherein the other of said casing sections has a recess of non-circular cross section in its inner surface and wherein said barrel has an end portion of cooperating cross section which is seated in said recess.

5. The coilable rule of claim 1 wherein said one casing section has a post thereon generally centrally of said hub seating recess, and wherein said hub has a bore therein into which said casing post extends to guide said hub on said one casing section.

6. The coilable rule of claim 1 wherein said hub seating recess of said one casing section is of greater depth than the thickness of said hub flange.

7. The coilable rule of claim 6 wherein said hub seating recess of said reel is of lesser depth than the thickness of said hub flange.

8. The coilable rule of claim 1 wherein said reel end walls have cylindrical bosses on the outer surfaces thereof, and said hub seating recess is disposed in a boss.

9. A cartridge for a power returnable coilable rule comprising:
   A. a reel having a cylindrical core, annular end walls of greater diameter than said core portion to provide an axially extending passage therethrough, said reel having a hub seating recess in the outer surface of one of said end walls about said passage, said core forming an annular chamber open at its inner periphery about said axially extending passage;
   B. an axially shiftable hub having a barrel in said passage of said reel and a flange adjacent one end seated in said seating recess, said hub flange and said hub seating recess being cooperatively configured and dimensioned for frictional engagement of said hub in said recess, said hub flange releasably locking in said recess to prevent relative rotation therebetween, said hub being freely slidable axially and rotatable in said reel passage upon disengagement of said flange from said recess, said hub having an axially extending passage therethrough to receive a shaft of a rule casing in which said cartridge is placed; and
   C. a recoilable spring coiled within said core of said reel and having its inner end engaged with said barrel, said hub being shiftable axially to seat said hub flange in a cooperating recess in the rule casing in which said cartridge is placed to effect simultaneous disengagement from the reel and engagement of the spring with the rule casing.

10. The cartridge of claim 9 wherein said hub seating recess and said hub flange are of generally polygonal cross section.

11. The cartridge of claim 10 wherein said flange has outwardly extending finger portions and said recess has cooperating finger portions.

12. The cartridge of claim 9 wherein said hub seating recess of said reel is of lesser depth than the thickness of said hub flange.

13. The cartridge of claim 9 wherein said reel end walls have cylindrical bosses on the outer surfaces thereof, and said hub seated recess is disposed in a boss.

14. In the method of making a coilable rule, the steps comprising:
   A. forming a reel having a cylindrical core, annular end walls of greater diameter than said core portion to provide an annular chamber thereabout, and an axially extending passage therethrough, said reel having a hub seating recess in the outer surface of one end wall about said passage;

B. seating in said passage of said reel the barrel of an axially shiftable hub which has a flange at the end thereof adjacent said one end wall, said flange and said hub seating recesses being cooperatively dimensioned and configured to snugly seat said flange, and pressing said flange into said recess to lock said hub against relative rotation;

C. engaging one end of a recoil spring with said barrel of said hub and coiling it within said core of said reel;

D. placing said reel subassembly in a casing section having a cooperatively configured hub seating recess in its inner surface; and E. axially shifting said hub to unseat said hub flange from said seating recess of said reel and seat it in said hub seating recess of said casing section to permit said reel to rotate about said hub and relative to said casing section.

15. The coilable rule making method of claim 14 wherein there is included the steps of placing a mating casing section over said reel and securing said casing sections in assembly.

16. The coilable rule making method of claim 14 wherein there is included the step of locking the other end of said recoil spring with respect to said reel to prevent its uncoiling.

17. The coilable rule making method of claim 16 wherein there is included the step of engaging one end of a coilable rule measuring blade with the other end of said recoil spring, unlocking said spring, and coiling said blade about said core portion by the coiling power of said spring.

* * * * *